United States Patent
Lukic et al.

(10) Patent No.: US 11,118,624 B2
(45) Date of Patent: Sep. 14, 2021

(54) CAGELESS FULL-COMPLEMENT ANTI-FRICTION BEARING AND PLANETARY GEARBOX HAVING SUCH AN ANTI-FRICTION BEARING

(71) Applicant: Maxon International AG, Sachseln (CH)

(72) Inventors: Darko Lukic, Freiburg (DE); Olaf Klein, Emmendingen (DE); Stefan Westholt, Sexau (DE)

(73) Assignee: MAXON INTERNATIONAL AG, Sachseln (CH)

( * ) Notice: Subject to any disclaimer, the term of this patent is extended or adjusted under 35 U.S.C. 154(b) by 0 days.

(21) Appl. No.: 16/968,200

(22) PCT Filed: Feb. 5, 2019

(86) PCT No.: PCT/EP2019/052761
§ 371 (c)(1),
(2) Date: Aug. 7, 2020

(87) PCT Pub. No.: WO2019/154799
PCT Pub. Date: Aug. 15, 2019

(65) Prior Publication Data
US 2021/0040986 A1    Feb. 11, 2021

(30) Foreign Application Priority Data

Feb. 8, 2018 (EP) ..................... 18155819

(51) Int. Cl.
*F16C 19/26* (2006.01)
*F16C 33/66* (2006.01)
*F16H 57/08* (2006.01)

(52) U.S. Cl.
CPC .......... *F16C 19/26* (2013.01); *F16C 33/6648* (2013.01); *F16H 57/08* (2013.01);
(Continued)

(58) Field of Classification Search
CPC .. F16C 19/26; F16C 33/6648; F16C 33/6651; F16C 2206/48; F16C 2240/84; F16C 2361/61; F16H 57/08; F16H 2057/085
See application file for complete search history.

(56) References Cited

U.S. PATENT DOCUMENTS

| 5,302,160 | A | | 4/1994 | Fujioka |
| 5,417,502 | A | * | 5/1995 | Waldert ................ F16C 33/543 384/572 |

(Continued)

FOREIGN PATENT DOCUMENTS

| CN | 1360161 A | 7/2002 |
| CN | 204041729 U | 12/2014 |

(Continued)

OTHER PUBLICATIONS

International Search Report (PCT/ISA/210) dated Apr. 4, 2019, by the European Patent Office as the International Searching Authority for International Application No. PCT/EP2019/052761.

(Continued)

*Primary Examiner* — Phillip A Johnson
(74) *Attorney, Agent, or Firm* — Buchanan Ingersoll & Rooney PC

(57) ABSTRACT

A full-complement anti-friction bearing is disclosed which includes a plurality of rolling elements, an inner bearing body in the form of a shaft or an axle with a cylindrical outer diameter, and an outer bearing body arranged concentrically with the latter and having an inner bore. In an exemplary embodiment, all rolling elements have the same outer diameter and are arranged between the inner bearing body and the outer bearing body in such a way that the rolling elements roll on the outer diameter of the inner bearing body and on the inner bore of the outer bearing body, the outer bearing body being thus rotatably supported relative to the inner (Continued)

Figure 1:
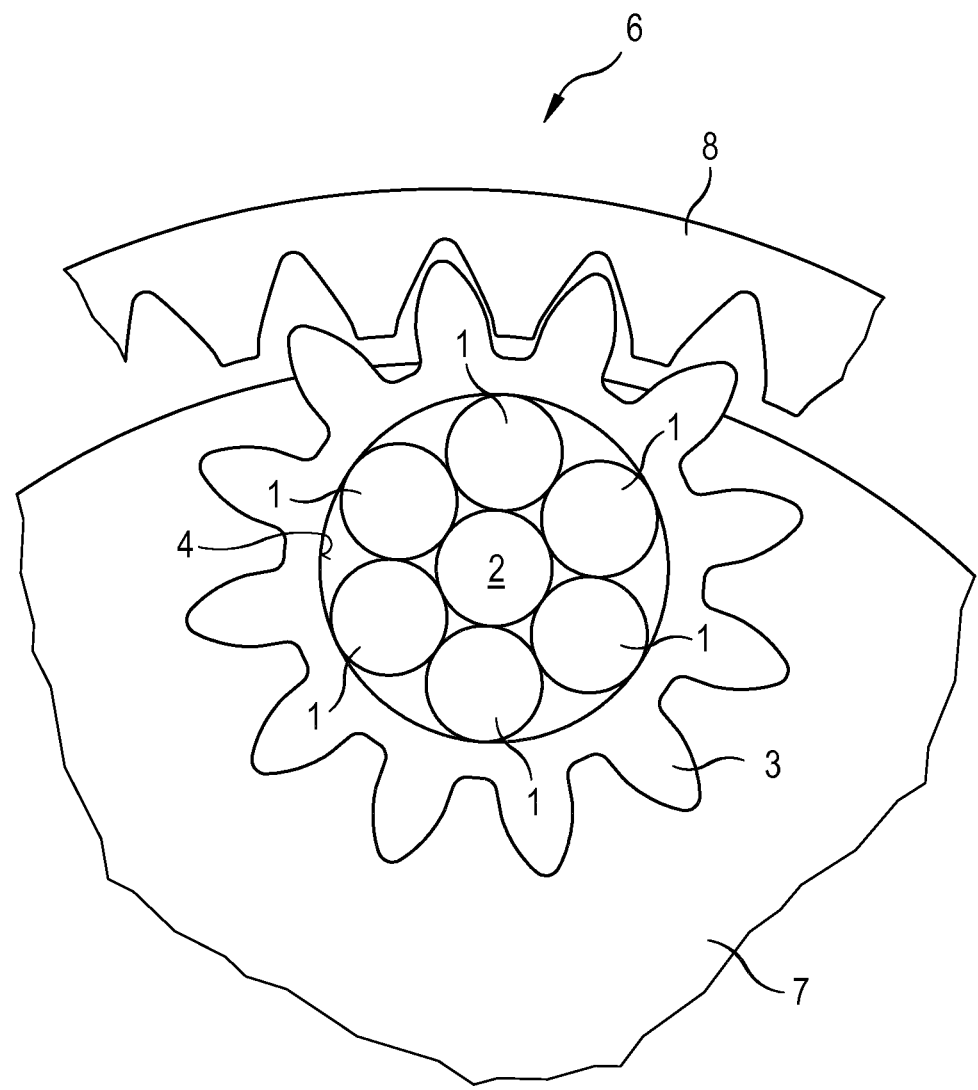

bearing body. In addition, the full-complement anti-friction bearing is configured without a cage.

20 Claims, 3 Drawing Sheets

(52) U.S. Cl.
CPC ...... *F16C 2206/48* (2013.01); *F16C 2240/70* (2013.01); *F16C 2361/61* (2013.01); *F16H 2057/085* (2013.01)

(56) References Cited

U.S. PATENT DOCUMENTS

| | | | |
|---|---|---|---|
| 6,875,111 B1 | 4/2005 | Rowell et al. | |
| 8,192,323 B2* | 6/2012 | Fox | F16H 57/082 |
| | | | 475/347 |
| 10,851,886 B2* | 12/2020 | Bujold | B60K 17/3515 |
| 2005/0075211 A1* | 4/2005 | Fox | F16C 19/386 |
| | | | 475/348 |

FOREIGN PATENT DOCUMENTS

| | | | |
|---|---|---|---|
| DE | 4009968 A1 | 11/1990 | |
| DE | 4133443 A1 | 4/1993 | |
| DE | 4418693 C1 | 3/1995 | |
| DE | 19902565 A1 | 7/2000 | |
| DE | 102014115227 A1 * | 5/2015 | .......... F16C 33/6614 |
| DE | 102014115227 A1 | 5/2015 | |
| DE | 102014215967 A1 | 2/2016 | |
| DE | 102015214581 A1 | 2/2017 | |
| DE | 102015215117 A1 | 2/2017 | |
| EP | 1217235 A2 | 6/2002 | |
| JP | 2007071355 A | 3/2007 | |
| JP | 2007232186 A * | 9/2007 | .......... F16C 33/3706 |

OTHER PUBLICATIONS

Written Opinion (PCT/ISA/237) dated Apr. 4, 2019, by the European Patent Office as the International Searching Authority for International Application No. PCT/EP2019/052761.
Extended European Search Report for European Application No. 18 15 5819.8 dated Apr. 25, 2019 (9 pages).

* cited by examiner

CAGELESS FULL-COMPLEMENT ANTI-FRICTION BEARING AND PLANETARY GEARBOX HAVING SUCH AN ANTI-FRICTION BEARING

The present invention relates to a full-complement anti-friction bearing according to the preamble of the independent claim 1 as well as to a planetary gearbox having such an anti-friction bearing.

A full-complement anti-friction bearing according to the preamble of the independent claim 1 comprises a plurality of rolling elements, an inner bearing body in the form of a shaft or an axle with a cylindrical outer diameter, and an outer bearing body arranged concentrically with the latter and having an inner bore. All the rolling elements have the same outer diameter and are arranged between the inner bearing body and the outer bearing body in such a way that the rolling elements roll on the outer diameter of the inner bearing body and on the inner bore of the outer bearing body, the outer bearing body being thus rotatably supported relative to the inner bearing body. In addition, a full-complement anti-friction bearing of the generic kind is configured without a cage.

A full-complement anti-friction bearing according to the preamble of the independent claim 1 is known e.g. from DE 10 2014 115227 A1. In this anti-friction bearing, a large number of rolling elements are provided, which have a comparatively small outer diameter in comparison with the outer diameter of the inner bearing body. The situation is similar in the case of the cageless, full-complement needle bearing described in DE 10 2000 9058811 A1. This reference suggests to configure the rolling elements such that two neighboring rolling elements have different surface finishes on contacting surfaces, so as to reduce the friction and optimize the load rating. A further full-complement, cageless anti-friction bearing is also described in DE 10 2014 215967 A1. Also in this bearing a large number of rolling elements are provided, which have a comparatively small outer diameter in comparison with the outer diameter of the inner bearing body. Reference DE 4133443 A1 describes a full-complement anti-friction bearing, which is not configured according to the preamble of the independent claim 1, since this anti-friction bearing comprises a cage. The bearing is configured such that loads cannot be applied to one or a plurality of cage bars in opposite directions.

It is an object of the present invention to provide a full-complement, cageless anti-friction bearing, which is suitable for high radial loads and which has a high efficiency. It is also an object of the present invention to keep the anti-friction bearing as compact as possible. In particular, the anti-friction bearing is intended to be suitable for supporting planetary gears of particularly compact planetary gearboxes having a diameter of less than 100 mm. The anti-friction bearing should also be easy to manufacture and easy to dimension.

The object is achieved by the features of the independent claim 1. Accordingly, for a full-complement anti-friction bearing according to the preamble of the independent claim 1, the object is achieved in accordance with the present invention when the anti-friction bearing has exactly six rolling elements, the outer diameter of the rolling elements corresponding substantially to the outer diameter of the inner bearing body, and a diameter of the inner bore of the outer bearing body being slightly larger than three times the outer diameter of the inner bearing body.

The anti-friction bearing according to the present invention may be either a roller bearing or a needle bearing. The rolling elements are preferably simple cylindrical rollers or needles. According to a further preferred embodiment, they have approximately the same axial length as the inner bore of the outer bearing body or the supporting length or effective length of the inner bearing body. According to another preferred embodiment, the outer diameter of the rolling elements corresponds precisely to the outer diameter of the inner bearing body.

The full-complement anti-friction bearing according to the present invention is particularly easy to dimension, since the rolling elements and the inner bearing body have the same outer diameter. This means that the diameter of the inner bore can easily be dimensioned such that it is slightly larger than three times the outer diameter of the inner bearing body or of the rolling elements, and this results in a very small amount of play that prevents the rolling elements from blocking one another. Geometrically, this has the effect that, in the case of the anti-friction bearing according to the present invention, the center points or the geometric axes of the rolling elements come to lie on a virtual hexagon, whose center point is located at the center of the inner bearing body, the corners of the virtual hexagon being located at a distance from the center point that corresponds to the diameter of a rolling element. The full-complement anti-friction bearing according to the present invention has also a very simple structural design and can thus be manufactured as a very compact component. Nevertheless, it is suitable to take up high radial loads and it is also highly efficient.

Advantageous embodiments of the present invention are the subject matters of the subclaims.

According to a particularly preferred embodiment of the present invention, the diameter of the inner bore of the outer bearing body is between 0.05% and 1% larger than three times the outer diameter of the inner bearing body. On the one hand, this embodiment guarantees that the rolling elements will not block one another and, on the other hand, the anti-friction bearing according to this embodiment is particularly suitable for taking up high radial loads.

According to a further preferred embodiment of the present invention, a lubricant or oil is introduced in the anti-friction bearing, so as to reduce the friction. For this purpose, the anti-friction bearing is preferably encapsulated.

According to a further preferred embodiment of the present invention, the inner bearing body has at least one circumferential groove as a reservoir for the lubricant or the oil. The groove width is here smaller than the axial length of the rolling elements and amounts preferably to a maximum of 50% of the axial length of the rolling elements, so that optimum force transmission between the inner bearing body and the rolling elements is always ensured. It is possible to provide, instead of a single groove, a plurality of grooves of the inner bearing body. For example, the grooves may be configured as simple annular grooves which are axially spaced apart.

According to another preferred embodiment of the present invention, the depth of the groove amounts to a maximum of 15% of the outer diameter of the inner bearing body, preferably to a maximum of 5% of the outer diameter of the inner bearing body. This will guarantee sufficient stability of the inner bearing body.

According to a further embodiment of the present invention, the groove is annular in shape. Preferably, the groove is here axially centered in relation to a geometric axis of the rolling elements. In this way, the lubricant or the oil will be dispensed uniformly, thus accomplishing optimum lubrication of the anti-friction bearing. In addition, also the radial loads will be transmitted uniformly to the front and rear parts of inner bearing body in this embodiment.

According to an alternative embodiment of the present invention, the groove extends at an oblique angle or spirally in relation to a geometric axis of the inner bearing body. This leads to an even better and an even more uniform lubrication. Also in this embodiment it is imaginable to provide a plurality of grooves. For example, the grooves may be arranged offset to one another similar to the threads of a multi-start thread.

According to a further preferred embodiment of the present invention, the rolling elements and/or the inner bearing body and/or the outer bearing body are made of metal or ceramic. In particular zirconia ceramic is highly suitable for producing the components referred to. According to yet another preferred embodiment, open-pored materials are used in this context, which may be impregnated with, or are impregnated with oil and a lubricant, respectively. Preferably, sintered materials are used for this purpose. The sintered material is preferably produced making use of a coarse-grained granulate. This allows a particularly simple and cost-effective production with homogeneously distributed pores. An open-pored structure for receiving therein an oil or a lubricant may also be produced from metal or ceramic by means of powder injection molding. Instead of using a coarse-grained granulate, it will also be possible to use a placeholder material. Alternatively, the open-pored structure may also be generated from a metal foam, a ceramic foam or a hollow sphere structure. Another possibility is production by means of selective laser sintering, selective laser melting or electron beam melting.

If the rolling elements and/or bearing bodies are made of steel, they are preferably coated with a very hard, friction-optimized and thus wear-reducing, diamond-like carbon layer, so as to increase the service life of the anti-friction bearing.

According to a further preferred embodiment of the present invention, the rolling elements are configured as sleeves. This results in a reduction of weight on the one hand and, on the other hand, the cavity within the sleeve may be used as a lubricant reservoir. In the case of this embodiment, the rolling elements are preferably made of steel. The above-mentioned coating consisting of a carbon layer may, of course, be provided.

The present invention also provides a planetary gearbox comprising a planet carrier and at least one planetary gear rotatably supported on the planet carrier, the planetary gear being rotatably supported on the planet carrier by means of the above-described full-complement anti-friction bearing according to the present invention.

According to an embodiment of the planetary gearbox, the inner bearing body is non-rotatably connected to the planet carrier or formed integrally with the planet carrier, the outer bearing body being configured such that it is non-rotatable relative to the planetary gear or defined by the planetary gear itself. It follows that, in this embodiment, the inner bearing body defines a stationary axle projecting axially from the planet carrier.

According to an alternative embodiment of the planetary gearbox, the inner bearing body is non-rotatably connected to the planetary gear or formed integrally with the planetary gear, the outer bearing body being configured such that it is non-rotatable relative to the planet carrier or defined by the planet carrier itself. If the latter is the case, the inner bore of the outer bearing body is a bore that is formed in the planet carrier eccentrically to the axis of the planet carrier.

According to a further preferred embodiment of the present invention, the planetary gearbox is a small-size planetary gearbox having a maximum diameter of 100 mm. It turned out that the anti-friction bearing according to the present invention is very suitable for use in such compact-type planetary gearboxes. Preferably, the diameter of the at least one planetary gear of the planetary gearbox amounts to a maximum of 40 mm. It goes without saying that, as is common practice with conventional planetary gearboxes, a plurality of planetary gears may be provided per gear stage, preferably evenly distributed over the circumference.

Figure 2:
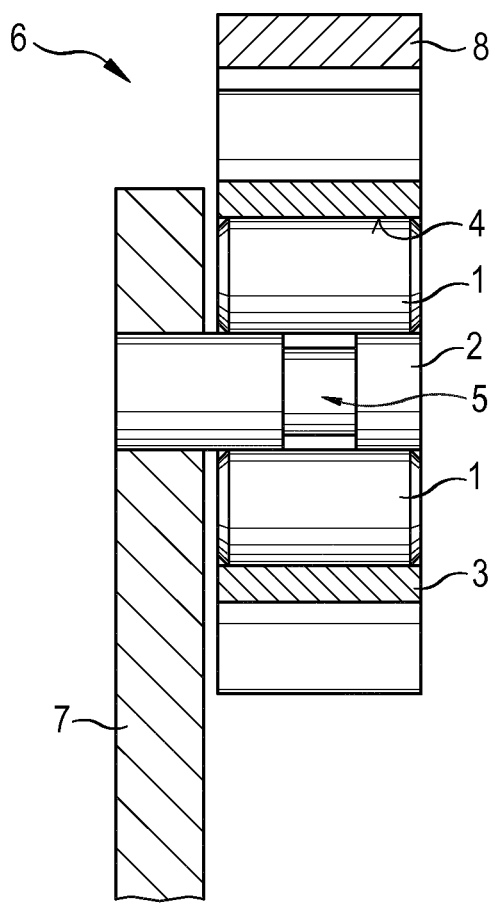
Figure 3:
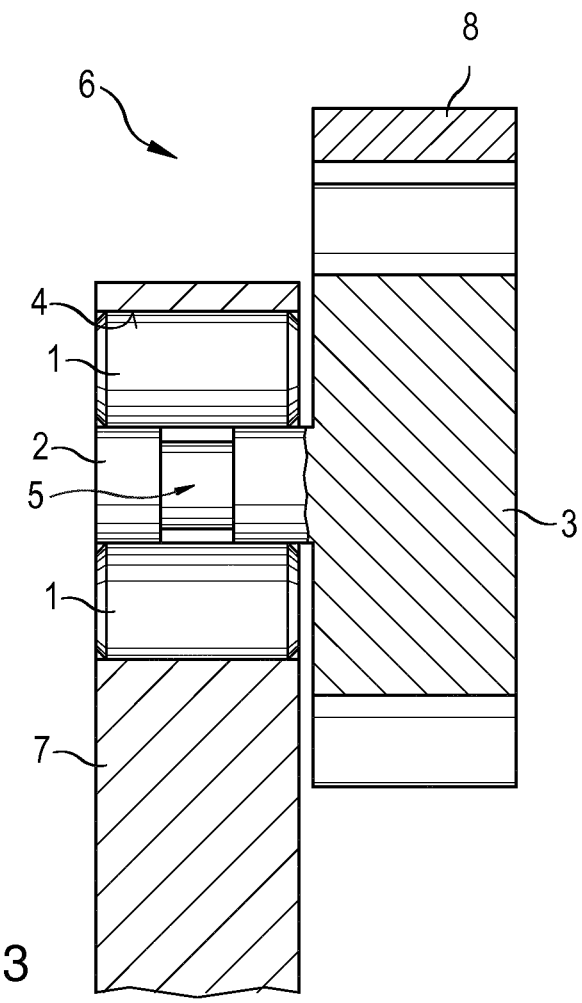
Figure 4:
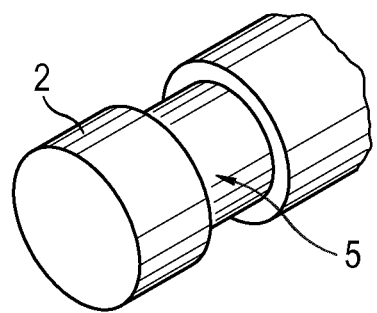

Embodiments of the present invention will be explained hereinafter in more detail making reference to drawings, in which:

FIG. 1 shows a schematic detail view of a planetary gearbox with a planetary gear rotatably supported on the associated planet carrier by means of a full-complement anti-friction bearing according to a first embodiment disclosed in the present invention, in a view parallel to the axis of the planetary gearbox, FIG. 2 shows a longitudinal section through the planetary gearbox according to FIG. 1, FIG. 3 shows a longitudinal section through a planetary gearbox with a full-complement anti-friction bearing according to a second embodiment disclosed in the present invention, FIG. 4 shows an oblique detail view of the inner bearing body of the anti-friction bearings according to the present invention, shown in FIGS. 1 to 3, and FIG. 5 shows an oblique detail view of the inner bearing body shown in FIG. 4, according to a modification.

In the statements following hereinafter like components are identified by like reference numerals. If a figure comprises reference numerals that are not dealt with in detail in the associated description of the respective figure, reference is made to preceding or subsequent descriptions of figures.

FIGS. 1 and 2 show, each schematically, a detail of a planetary gearbox 6. They show a section of a ring gear 8 and a section of the planet carrier 7 of the planetary gearbox 6. In addition, one of a plurality of planetary gears 3 is shown, the planetary gears 3 being evenly distributed over the circumference of the planetary gearbox and being each in mesh with internal teeth of the ring gear 8.

The planetary gear 3 is rotatably supported on the planet carrier by means of a full-complement anti-friction bearing according to the present invention. The anti-friction bearing comprises an inner bearing body 2 in the form of a cylindrical pin, which is fixedly connected to the planet carrier 7, as well as an outer bearing body arranged concentrically thereto, the outer bearing body being supported by means of a plurality of rolling elements 1 such that it is rotatable relative to the inner bearing body. The inner bearing body 2 thus defines a stationary axle in the case of the embodiment according to FIGS. 1 and 2. The outer bearing body is defined by the planetary gear 3 itself and has an inner bore 4. The rolling elements 1 are arranged between the inner bearing body and the outer bearing body such that the rolling elements roll on the outer diameter of the inner bearing body and on the inner bore of the outer bearing body.

According to the present invention, exactly six rolling elements are provided. The outer diameter of the rolling elements corresponds to the outer diameter of the inner bearing body. The diameter of the inner bore 4 is slightly larger than three times the outer diameter of the inner bearing body and of the rolling elements, respectively, so as to prevent the rolling elements from blocking one another.

More precisely, the diameter of the inner bore is between 0.05% and 1% larger than three times the outer diameter of the inner bearing body.

As can be seen in FIG. 2, the inner bearing body 2 has an annular circumferential groove 5 having provided therein a lubricant or oil so as to reduce friction. The circumferential groove thus serves as a reservoir for the lubricant or the oil. The groove has a depth amounting to a maximum of 15% of the outer diameter of the inner bearing body. It is axially centered in relation to a geometric axis of the rolling elements, so as to ensure optimum lubrication and load distribution. FIG. 4 shows an oblique detail view of the inner bearing body 2 with the annular circumferential groove 5. At this point it is emphasized once more that the drawings are only of a schematic nature. The anti-friction bearing is preferably encapsulated, a circumstance which is not shown in the figures, nor do the figures show the necessary axial fixing of the rolling elements and of the inner bearing body, respectively.

FIG. 3 shows an alternative embodiment. In contrast to the embodiment according to FIGS. 1 and 2, the inner bearing body 2 is here not fixedly connected to the planet carrier 7, but it is connected to the planetary gear 3 or formed integrally with the planetary gear 3. The inner bore 4 is thus located in the planet carrier 7. The rolling elements 1 are arranged between the outer diameter of the inner bearing body and the inner bore of the planet carrier 7.

Figure 5:
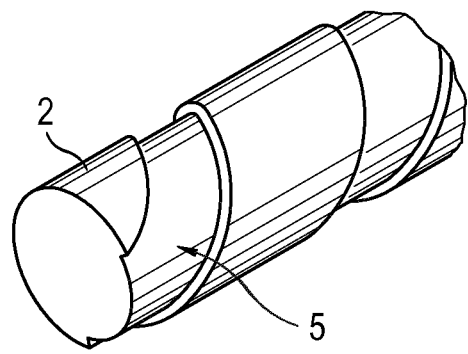

Finally, FIG. 5 shows an alternative embodiment of the inner bearing body 2. Instead of an annular circumferential groove, a spiral groove 5 is provided in the case of this embodiment. This embodiment allows a still further optimized lubrication between the inner bearing body and the rolling elements.

The rolling elements, the inner bearing body and the outer bearing body are preferably made of metal or ceramic in all the embodiments. In particular zirconia ceramic is highly suitable for producing the components referred to. In order to improve lubrication, the components referred to may be made of an open-pored material impregnated with oil and a lubricant, respectively. If the rolling elements and/or the bearing bodies are made of steel, they are preferably coated with a very hard, friction-optimized and thus wear-reducing, diamond-like carbon layer, so as to increase the service life of the anti-friction bearing. The rolling elements may also be configured as sleeves so as to save weight on the one hand and allow the cavity inside the sleeve to be used as a lubricant reservoir on the other.

The planetary gearbox shown is a compact planetary gearbox having a maximum diameter of 100 mm. The maximum diameter of the planetary gear shown is 40 mm.

The invention claimed is:

1. A full-complement anti-friction bearing, comprising:
   a plurality of rolling elements;
   an inner bearing body formed as a shaft or an axle with a cylindrical outer diameter; and
   an outer bearing body arranged concentrically with the inner bearing body and having an inner bore, wherein all the rolling elements have a same outer diameter and are arranged between the inner bearing body and the outer bearing body in such a way that the rolling elements will roll on the outer diameter of the inner bearing body and on the inner bore of the outer bearing body, the outer bearing body being thus rotatably supported relative to the inner bearing body; and
   wherein the anti-friction bearing is configured without a cage, and wherein the anti-friction bearing has exactly six rolling elements, the outer diameter of the rolling elements corresponding substantially to the outer diameter of the inner bearing body, and a diameter of the inner bore (4) of the outer bearing body being slightly larger than three times the outer diameter of the inner bearing body.

2. The full-complement anti-friction bearing according to claim 1, wherein the diameter of the inner bore of the outer bearing body is between 0.05% and 1% larger than three times the outer diameter of the inner bearing body.

3. The full-complement anti-friction bearing according to claim 2, comprising:
   a lubricant or oil in the anti-friction bearing to reduce friction.

4. The full-complement anti-friction bearing according to claim 3, wherein the rolling elements and/or the inner bearing body and/or the outer bearing body are made of zirconia ceramic.

5. The full-complement anti-friction bearing according to claim 1, comprising:
   a lubricant or oil in the anti-friction bearing to reduce friction.

6. The full-complement anti-friction bearing according to claim 5, wherein the inner bearing body comprises:
   at least one circumferential groove as a reservoir for the lubricant or the oil.

7. The full-complement anti-friction bearing according to claim 6, wherein a depth of the groove amounts to a maximum of 15% of the outer diameter of the inner bearing body.

8. The full-complement anti-friction bearing according to claim 7, wherein the groove is annular in shape and axially centered in relation to a geometric axis of the rolling elements.

9. The full-complement anti-friction bearing according to claim 7, wherein, in relation to a geometric axis of the inner bearing body, the groove extends at an oblique angle or spirally.

10. The full-complement anti-friction bearing according to claim 7, wherein, in relation to a geometric axis of the inner bearing body, the groove extends at an oblique angle or spirally.

11. The full-complement anti-friction bearing according to claim 6, wherein the groove is annular in shape and axially centered in relation to a geometric axis of the rolling elements.

12. The full-complement anti-friction bearing according to claim 6, wherein, in relation to a geometric axis of the inner bearing body, the groove extends at an oblique angle or spirally.

13. The full-complement anti-friction bearing according to claim 6, wherein a depth of the groove amounts to a maximum of 15% of the outer diameter of the inner bearing body.

14. The full-complement anti-friction bearing according to claim 1, wherein the rolling elements and/or the inner bearing body and/or the outer bearing body are made of metal or ceramic.

15. The full-complement anti-friction bearing according to claim 14, wherein the rolling elements and/or the inner bearing body and/or the outer bearing body are made of an open-pored material impregnated with oil and a lubricant, respectively.

16. A planetary gearbox comprising:
   a planet carrier;
   at least one planetary gear rotatably supported on the planet carrier; and a full-complement anti-friction bearing according to claim 1 for rotatably supporting the planetary gear on the planet carrier.

17. The planetary gearbox according to claim 16, wherein the inner bearing body is non-rotatably connected to the planet carrier or formed integrally with the planet carrier, the outer bearing body being configured such that it is non-rotatable relative to the planetary gear or defined by the planetary gear itself.

18. The planetary gearbox according to claim 16, wherein the inner bearing body is non-rotatably connected to the planetary gear or formed integrally with the planetary gear, the outer bearing body being configured such that it is non-rotatable relative to the planet carrier or defined by the planet carrier itself.

19. The planetary gearbox according to claim 16, wherein the planetary gearbox is a small-size planetary gearbox having a maximum diameter of 100 mm.

20. The planetary gearbox (6) according to claim 16, wherein a diameter of the at least one planetary gear amounts to a maximum of 40 mm.

\* \* \* \* \*